(12) United States Patent  
Xie

(10) Patent No.: US 9,993,790 B2  
(45) Date of Patent: Jun. 12, 2018

(54) ISOTHERMAL CONVERSION REACTOR WITH HIGH CO AND HIGH CONVERSION RATE, AND PROCESS THEREFOR

(71) Applicant: Hunan Anchun Advanced Technology Co., Ltd, Changsha (CN)

(72) Inventor: Dingzhong Xie, Changsha (CN)

(73) Assignee: Hunan Anchun Advanced Technology Co., Ltd, Changsha, Hunan Province (CN)

( * ) Notice: Subject to any disclaimer, the term of this patent is extended or adjusted under 35 U.S.C. 154(b) by 379 days.

(21) Appl. No.: 14/912,869

(22) PCT Filed: Sep. 25, 2013

(86) PCT No.: PCT/CN2013/084160  
§ 371 (c)(1),  
(2) Date: Feb. 18, 2016

(87) PCT Pub. No.: WO2015/024287  
PCT Pub. Date: Feb. 26, 2015

(65) Prior Publication Data  
US 2016/0200572 A1 Jul. 14, 2016

(30) Foreign Application Priority Data  
Aug. 20, 2013 (CN) .......................... 2013 1 0364045

(51) Int. Cl.  
*B01J 8/04* (2006.01)  
*C01B 3/14* (2006.01)  
(Continued)

(52) U.S. Cl.  
CPC .............. *B01J 8/0457* (2013.01); *B01J 8/025* (2013.01); *B01J 8/0278* (2013.01); *B01J 8/0407* (2013.01);  
(Continued)

(58) Field of Classification Search  
CPC ...... B01J 8/0403; B01J 8/0407; B01J 8/0415; B01J 8/125; B01J 8/0214; B01J 8/043;  
(Continued)

(56) References Cited

U.S. PATENT DOCUMENTS 3,825,501 A * 7/1974 Muenger ................ B01J 8/0285  
    252/373  
4,321,234 A * 3/1982 Ohsaki ................... B01J 8/0005  
    422/200  
6,306,354 B1 * 10/2001 Szydlowski ............. B01J 8/025  
    422/198

FOREIGN PATENT DOCUMENTS

CN     89104239.3 A     2/1990  
CN    101721956 A *    6/2010  
(Continued)

*Primary Examiner* — Jennifer A Leung  
(74) *Attorney, Agent, or Firm* — Timothy T. Wang; Ni, Wang & Massand, PLLC

(57) ABSTRACT

An isothermal carbon monoxide (CO) shift reactor having high CO conversion and the process technology comprises the outside pressure vessel; the catalyst unit; upper and lower tube sheets welded with water tubes and bottom tee joints; the said outside pressure vessel has seal heads at the upper and lower ends; the said vessel has a water chamber and a steam chamber at the upper section. The catalyst unit comprises the upper catalyst bed with water tubes. There is a central pipe that is located in the said vessel, of which the upper end is located in the upper catalyst bed while the lower end is located in the lower catalyst bed; the said bottom tee joint has an inlet for feed gas, outlet for reacted shift gas and inlet for steam-water mixture; the said central pipe is installed with spray nozzle for steam-water mixture; the said reactor is applicable for process technologies for feed and effluent gas having different CO contents. Low temperature, high CO feed content, high shift conversion and low system pressure drop are direct results of this disclosure.

8 Claims, 6 Drawing Sheets

(51) Int. Cl.
    *C01B 3/16*         (2006.01)
    *B01J 8/02*         (2006.01)

(52) U.S. Cl.
    CPC ........... *B01J 8/0415* (2013.01); *B01J 8/0453* (2013.01); *B01J 8/0473* (2013.01); *B01J 8/0492* (2013.01); *B01J 8/0496* (2013.01); *C01B 3/14* (2013.01); *C01B 3/16* (2013.01); *B01J 2208/0053* (2013.01); *B01J 2208/00123* (2013.01); *B01J 2208/00132* (2013.01); *C01B 2203/0283* (2013.01); *C01B 2203/1205* (2013.01); *Y02P 20/129* (2015.11); *Y02P 20/52* (2015.11)

(58) Field of Classification Search
    CPC ...... B01J 8/0257; B01J 8/0434; B01J 8/0469; B01J 8/087; B01J 2208/00123; F28D 2021/022
    See application file for complete search history.

(56) References Cited

FOREIGN PATENT DOCUMENTS

| | | | | |
|---|---|---|---|---|
| CN | 200910227101.1 | A | 6/2010 | |
| CN | 201210377596.8 | A | 1/2013 | |
| DE | 3318098 | A1 * | 11/1984 | ............ B01J 8/0214 |
| EP | 0269171 | A2 * | 6/1988 | ............ B01J 8/0214 |

* cited by examiner

ISOTHERMAL CONVERSION REACTOR WITH HIGH CO AND HIGH CONVERSION RATE, AND PROCESS THEREFOR

BACKGROUND

Technical Field

The instant disclosure may be applicable to multiple chemical production processes such as ammonia synthesis, methanol synthesis, ethylene glycol production, coal-to-natural gas substitute natural gas (SNG), hydrogen production and the re-utilization of industrial off-gas, especially for processes having high carbon monoxide (CO) conversion output that may be as high as 98.5%; for processes having industrial off-gas or coal gas that has high CO concentration that may be as high as 85%, as a feed for hydrogen production.

Background

Coal gas, gas from natural gas reforming process, gas from coke-oven reforming process, calcium carbide process off-gas, blast furnace coal gas etc., comprise a large CO content, for example, the CO content of calcium carbide process off-gas may be 80% and that of coal gas may be anywhere between 30%~68% depending on the coal gasification process. The instant disclosure may provide an apparatus and process for converting this waste CO into a useable product.

SUMMARY

As the adiabatic shift technology has the disadvantages described above, the primary purpose of this apparatus and method are to provide an isothermal shift reactor having high CO conversion performance, mild reaction condition and low system pressure drop.

In one embodiment a reactor for isothermal shift or other chemical reactions, comprising, an outside pressure vessel defining a chamber, wherein the chamber comprises upper and lower tube sheets located at an upper section of the chamber, a bottom tee joint located at a bottom of the outside pressure vessel chamber, wherein the bottom tee joint has an unreacted gas entrance for unreacted gas, a reacted gas outlet for reacted gas, and a steam-water entrance for a steam-water mixture, all upper seal head coupled to an outside pressure vessel chamber upper end, a lower seal head coupled to an outside pressure vessel chamber lower end, a water chamber defined by the upper seal head and the upper tube sheet, a steam chamber defined by the upper tube sheet and a lower tube sheet, the water chamber is connected by connection tubes to the steam chamber located at the outside pressure vessel chamber upper end, an upper catalyst bed located at an upper mid portion of the outside pressure vessel chamber, the upper catalyst bed and an inner wall of the outside pressure vessel defining an annular space, wherein the unreacted gas flows through the unreacted gas entrance to the annular space to the upper catalyst bed and the reacted gas flows out of the lower catalyst bed through the reacted gas outlet, a lower catalyst bed located at a lower mid portion of the outside pressure vessel chamber, a supporting seal head is located between the upper catalyst bed and lower catalyst bed, and an inner unit of the outside pressure vessel comprises central tubes having a central tube upper end located in the upper catalyst bed and having a central tube lower end located in the lower catalyst bed, wherein the central tubes have a sprayer nozzle for the steam-water mixture, wherein the sprayer nozzle for steam-water mixture is connected to the steam water entrance.

In another embodiment a process for an isothermal shift reaction, comprising, (a) introducing feed gas having CO concentration by volume of approximately 40% to approximately 75% at a 1st water separator, wherein a gas temperature is approximately 230° C. to approximately 240° C. at a guard column inlet and approximately 255° C. to approximately 265° C. at an isothermal shift reactor inlet, (b) reacting the feed gas in the isothermal shift reactor, wherein a temperature range in an upper catalyst bed and lower catalyst bed is within approximately 260° C. to approximately 275° C. and the CO concentration by volume of the shifted gas is approximately 0.4% to approximately 0.7%, and (c) sending the shifted gas from the reactor to a heat exchanger, a 1st waste heat boiler, a 2nd waste heat boiler, a 2nd water separator, a heater for a boiler feed water, a cooler, a 3rd water separator and to a downstream process, wherein the gas temperature is approximately 255° C. to approximately 265° C. at a heat exchanger inlet, approximately 170° C. to approximately 190° C. at a 2nd water separator inlet, approximately 75° C. to approximately 80° C. at a cooler inlet and approximately 35° C. to approximately 50° C. at a 3rd water separator inlet.

In a further embodiment a process for an isothermal shift reaction, comprising, (a) receiving an inlet industrial off-gas having CO concentration by volume of approximately 45% to approximately 85% flows through at stripping tower, a 4th water separator, a filter, a gas compressor, a degreaser, a heat exchanger, a guard column, a hydrogenation converter to remove un-saturated hydrocarbons, and to an isothermal shift reactor, wherein a gas temperature of the industrial off-gas is approximately 200° C. to approximately 225° C. at a guard column inlet and approximately 225° C. to approximately 250° C. at an isothermal shift reactor inlet, (b) reacting the industrial off-gas in the isothermal shift reactor, wherein as temperature range in an upper catalyst bed and lower catalyst bed of is approximately 235° C. to approximately 260° C., (c) sending the gas flows through a reactor outlet to to steam dryer creating dried superheated steam, and (d) sending the shifted gas through the heat exchanger, a desalted boiler water heater, a deoxygenated water heater, a cooler, a 5th water separator and a downstream process, wherein the temperature range of the shifted gas is approximately 230° C. to approximately 255° C. at a heat exchanger inlet approximately 75° C. to approximately 80° C. at a cooler inlet and approximately 35° C. to approximately 50° C. at a 3rd water separator inlet.

In yet another embodiment a process for isothermal shift reaction, comprising, (a) sending semi-water coal gas having a CO concentration by volume of approximately 25% to approximately 38% through a filter, a heat exchanger, a guard column and an isothermal shift reactor, wherein a semi-water coal gas temperature is approximately 210° C. to approximately 230° C. at a guard column inlet and approximately 230° C. to approximately 250° C. at an isothermal shift reactor inlet, (b) reacting the semi-water coal gas in the isothermal shift reactor, wherein a temperature range is within approximately 235° C. to approximately 260° C. in an upper catalyst bed and lower catalyst bed and a reacted gas enters a steam dryer, in which the steam becomes superheated, and (c) sending the reacted gas from the steam dryer to the heat exchanger, a boiler feed water heater, a desalted water heater, a cooler, a 6th water separator and a downstream process, wherein a temperature of the shifted gas is approximately 230° C. to approximately 255° C. at a heat exchanger inlet, approximately 75° C. to approximately 80° C. at a cooler inlet and approximately 35° C. to approximately 50° C. at a 6th water separator inlet.

DETAILED DESCRIPTION OF THE INVENTION

Figure 1:
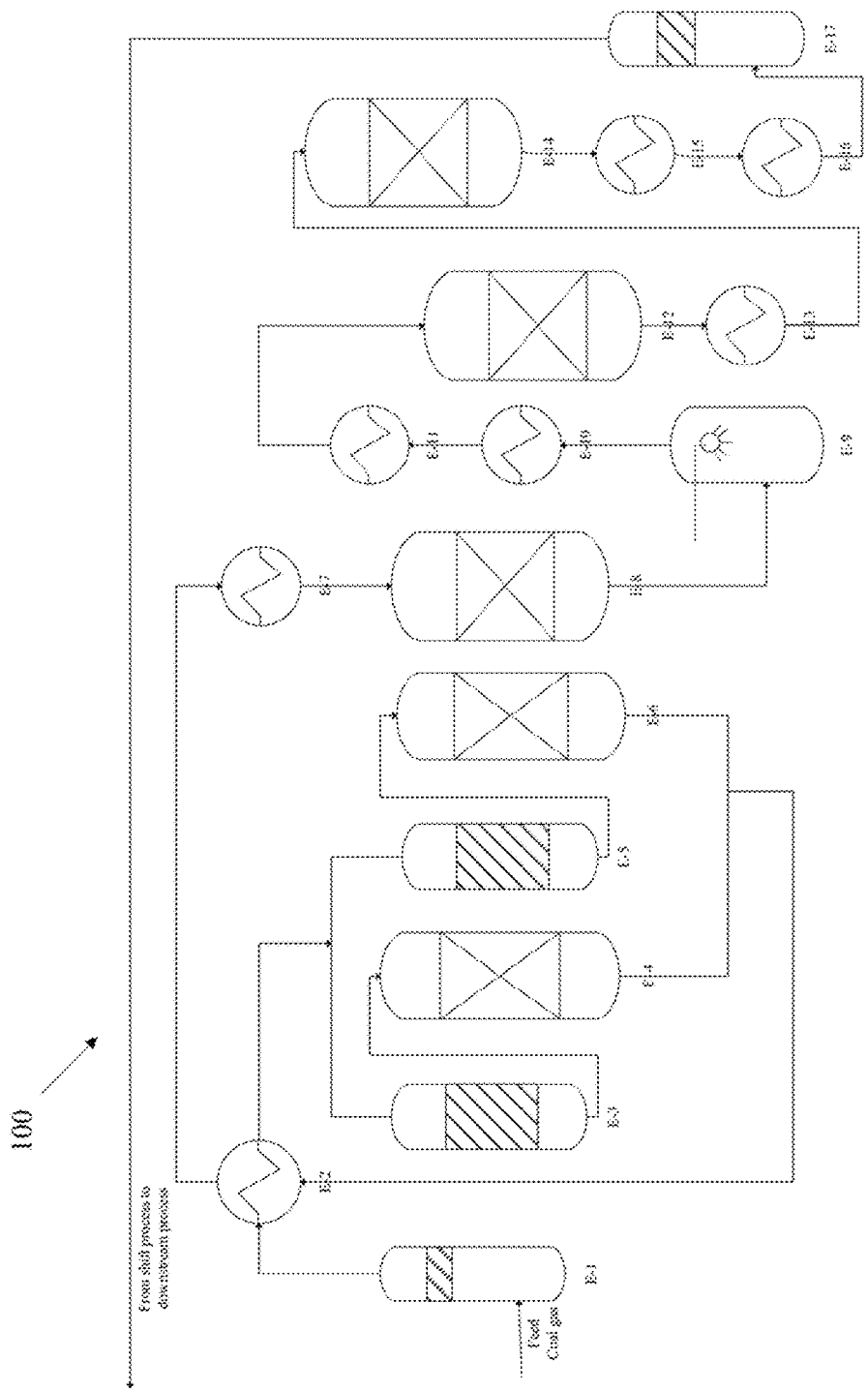
FIG. 1 is a process chart of existing adiabatic shift technology in accordance with one embodiment of the disclosure.
Figure 2:
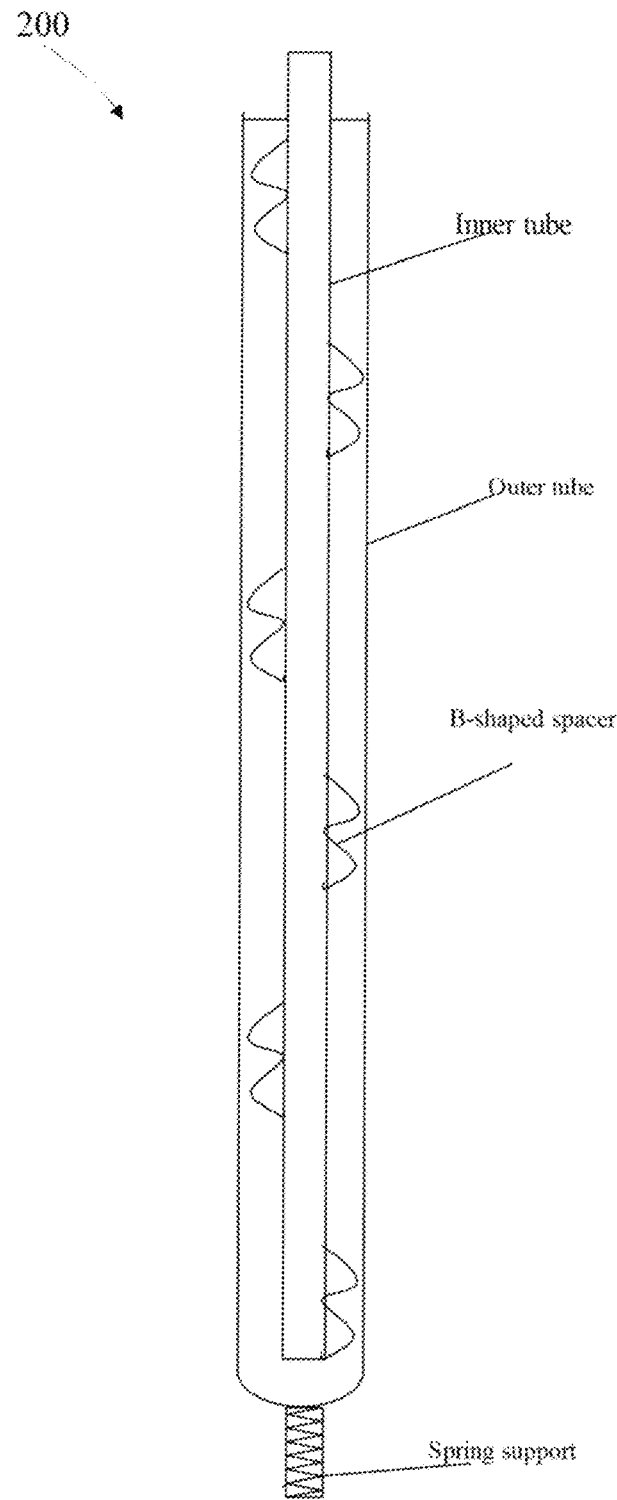
FIG. 2 is an illustration of the said concentric double steam-water tube set assembly in accordance with one embodiment of the disclosure.

The embodiments listed below are written only to illustrate the applications of this apparatus and method, not to limit the scope. The equivalent form of modifications towards this apparatus and method shall be categorized as within the scope the claims.

A type of isothermal shift reactor having high CO conversion performance comprising the outside pressure vessel with water chamber and steam chamber, upper and lower tube sheets which locates at the upper section of the chambers respectively, and tee joints locates at the bottom of the outside pressure vessel; the said outside pressure vessel has a upper and a lower cast end. The chamber between upper cast end-cap of the outside pressure vessel and the said upper tube sheet is the water chamber, and the chamber between the upper tube sheet and lower tube sheet is the steam chamber; the characteristic is as below: the said water chamber is connected through piping to the steam drum which locates of a higher level of the outside pressure vessel; the steam drum is connected to the said steam chamber through piping; the upper catalyst bed and has lower catalyst bed locate in the catalyst basket inside the pressure vessel. There is annular space between the said upper catalyst bed and the inner wall, of the outside pressure vessel and there is a cast end-cap separating the said upper and lower catalyst area. There is a central pipe, of which the upper end locates in the upper catalyst bed while the lower end locates in the lower catalyst bed; the said bottom tee joint has an inlet for the feed gas, an outlet for the reacted gas and an inlet for supplemental steam-water mixture; the feed gas runs through the said inlet to the annular space upwards to the said upper catalyst bed; the reacted gas runs downwards in the central pipe and out of the lower catalyst bed through the said outlet; the said central pipe is installed with a sprayer nozzle for the supplemental steam-water mixture: the said sprayer nozzle for steam-water mixture is connected with the said inlet at the joint tee for steam-water mixtures. Furthermore, the apparatus of the instant disclosure provides the features as below:

A number of vertically configured water-steam tubes are installed in the upper catalyst bed for temperature control and steam production.

The said water-steam tubes are of two types: 1) concentric double water-steam tubes, and 2) U-shaped water-steam tubes. For the sets of the concentric tubes of the former type, the outer tube runs outside of the inner tube with the support of positioning spacers; A spring part is installed at the bottom of the outside tubes; The bottom of the inner tube is open to the bottom of the outer tube; The top of the inner tube is open to the said water chamber; The top of the outer tube is open to the said steam chamber. For the latter type, the two ends of the U shaped tube have different lengths; the longer side is open to the water chamber and the shorter side is open to the steam chamber.

For catalyst loading and un-loading considerations, there are catalyst loading pipes at the top of the upper catalyst bed; there is also a circular opening at the cast end-cap that separates the upper and the lower catalyst bed; and there are un-loading pipes at the bottom of the lower bed.

The catalyst volume in the upper bed is approximately 48%~60% of the total loading volume; that in the lower bed is of approximately 40%-52% of the total. As a specific selection, the said positioning spacer between the outer and inner tube is of a B-shaped one. The said positioning component at the bottom of the outer tube is a spring. In order to ensure the spray effect of the gas flow, the wall of the said upper and the lower catalyst bed and the wall of the central pipe are perforated with trumpet-shaped openings.

The instant disclosure provides a process technology for coal gas CO shift reaction having high CO conversion performance.

1) The feed gas having CO concentration (by volume) of 40%~70% flows through the 1st water separator, the heat exchanger and the guard column, then to the said isothermal shift reactor having high CO conversion performance as above; the gas temperature is 230° C.~240° C. at the guard column inlet, and 255° C.~265° C. at the isothermal shift reactor inlet.

2) The temperature in the upper catalyst bed and lower catalyst bed in the isothermal reactor is 260° C.~275° C. The CO concentration (by volume) of the shined gas is 0.4%~0.7% after the reaction;

3) The reacted gas flows out of the isothermal reactor, then through the heat exchanger, the 1st waste heat boiler, the 2nd waste heat boiler, the 2nd water separator, the boiler feed water heater, the cooler, the 3rd water separator and then flows to downstream process; the gas temperature is 255~265° C. at the inlet of heat exchanger; 170° C.~190° C. at the inlet of the 2nd water separator; 75° C.~80° C. at the inlet of the cooler; 35° C.~50° C. at the inlet of the 3rd water separator.

The heated boiler desalted water flows to the steam drum; the produced saturated steam, the 1st waste heat boiler, the 2nd waste heat boiler and the steam drum; then to the plant steam pipeline system. Thus, heated boiler desalted water is sent to the steam drum and utilized for water supply for the steam-water tubes in the shift reactor and make-up water for waste heat boiler. Saturated steam of three different pressures are produced and sent to plant steam system.

The instant disclosure also provides a process technology for utilizing industrial off-gas for isothermal CO shift reaction and achieves high CO conversion, and the steps are as below;

1) The industrial off-gas having CO concentration (by volume) of 45%~85% flows through the stripping column, the 4th water separator, the filter, gets compressed in the gas compressor, degreased in the degreaser and then into the heat exchanger, then flows out of the heat exchanger and to the guard and then to the hydrogenation reactor for unsaturated hydrocarbon removal, then to the isothermal shift reactor having high CO conversion performance as mentioned above; the gas temperature at the guard column inlet is 200° C.~225° C., and 225° C.~250° C. at the isothermal shift reactor inlet.

2) The temperature range in upper and lower catalyst bed in the isothermal reactor is 235° C.~260° C. The reacted gas flows into the steam dryer and produces saturated steam in situ. The gas from the steam dryer flows through the heat exchanger, the boiler desalted water heater, the deoxygenated water heater, the cooler, the 5th water separator and flows to downstream process. The gas temperature at the heat exchanger inlet is 230° C.~255° C., and 75° C.~80° C. at the cooler inlet, and 35° C.~50° C. at the 3rd water separator inlet.

Furthermore, the heated boiler desalted water flows into the steam drum, saturated steam-water mixture is added from the bottom of the said shift reactor.

Thus, the heated boiler desalted water flows to steam drum, utilized as make-up water supply the steam-water tubes in the isothermal reactor, generating medium pressure steam as reactant for the shift reaction. The addition of the saturated steam-water mixture at the bottom of the reactor is to improve the reaction equilibrium and CO conversion.

The instant disclosure also provides a process technology for semi-water coal gas isothermal shift reaction to achieve high-CO conversion, and the steps are as below:

1) The semi water coal gas having CO concentration (by volume) of 25%~38% flows through the filter to the heat exchanger, then to the guard column and the isothermal shift reactor having high CO conversion mentioned above; the temperature of the semi water coal gas is 210° C.~230° C. at the heat exchanger and 230° C.~250° C. at the isothermal shift reactor inlet.

2) The temperature of the reaction gas in the upper catalyst bed and lower catalyst bed in the isothermal shift reactor is 235° C.~260° C. After the reaction the gas exits the isothermal reactor and enters into steam dryer where saturated steam is generated.

3) The reaction gas exits the steam dryer then to the heat exchanger, the boiler feed water heater, desalted water heater, the cooler, the 6th water separator in series and then flows to downstream process: the reacted gas temperature is 230° C.~255° C. at the heat exchanger inlet and 75° C.~80° C. at the cooler inlet, 35° C.~50° C. at the 6th water separator inlet.

Heated boiler desalted water flows into steam drum and enter into isothermal shift reactor from the bottom as a saturated steam-water mixture and participates in the shift reaction.

Thus, the heated boiler desalted water is sent to the steam drum as make-up supply for the steam-water tubes in the shift reactor. The generated medium pressure steam is added back into the reactor for the shift reaction. Additional saturated steam-water mixture is also sent from the bottom the said shift reactor to favor the shift reaction equilibrium and improve CO conversion.

Thus, embodiments of the instant disclosure are applicable for hydrogen production for the reaction of steam and CO from industrial off-gas, coal gas having CO concentration (by volume) of 40%~85 to achieve CO conversion of 98% or higher. 90%~95% CO conversion is completed in the upper catalyst bed. Reaction temperature stays well above the low end of the catalyst activity range to mitigate dew point concerns. Several process technologies have been developed in herein: one is the medium and high pressure shift technology using high steam-gas ratio for high CO feed content; and the second is the low pressure shift technology using low steam-gas ratio for high CO feed content; the third is low steam-gas ratio having high CO conversion. A feature of this apparatus and method are to use one shift reactor and relatively simple and easy-to-operate process to attain high CO conversion. Other features includes: the evolved reaction heat is used to by-producing medium pressure steam; Excess heat from steam condensation is used to produce low pressure steam to result in less condensation and high efficiency; Catalyst lifetime is extended; Shift reactor system pressure drop is lowered.

Compared with the conventional shift reaction technology, the advantages of this technology are as below:

1. The technology of this apparatus and method are that a large number of concentric steam-water tube sets are immersed in catalyst bed. The heat released from the catalytic reaction is absorbed by the water in the tubes. The vaporization process removes the heat from the catalyst bed to keep the reaction temperature. One features includes: The vaporization process is highly efficient; the reaction heat may be absorbed immediately to ensure bed temperature constancy and avoid spotty high temperature rise; and prolongs catalyst lifetime; low reaction temperature and wide temperature delta to equilibrium point drives the reaction to higher CO conversion and higher catalyst efficiency, lower catalyst volume and higher production capacity.

2. The CO content of feed gas may be as high as 80%. The effluent CO content after the shift reaction may reach as low as 0.4%. For gasification process using coal, pure oxygen and water steam, the steam-gas water ratio is in the range of 1.1~1.6. The complex shift process may be completed by using this reactor having high CO conversion. Less reactors may be deployed in this shorter process design.

3. As for the advantages listed above, the reaction process may be fully controlled by adjusting the steam drum pressure; reaction temperatures stays constant; CO conversion stable; the reaction mentioned above has less reactors and shorter process, which results in less land use thus less investment on the shift process.

4. This shift reactor is a low temperature and isothermal reactor. The temperature is within the low end of the catalyst activity range (230° C.~310) and the maximum axial temperature variation in the catalyst bed is 3° C.~8° C. Thus the catalyst lifetime is extended and high-cost heat resistant material is not needed for the reactor-making.

5. The evolved reaction heat may be used for producing 3.9 MPa medium pressure steam and make full use of the large quantity of steam generated from the coal gas having high steam-gas ratio gas and participate the shift reaction; while in the existing adiabatic shift process, excess steam in the coal gas needs to be condensed first; after the shift reaction in the 1st stage, water spray steam needs to be added back into the reaction. The remaining condensation heat is used to generate 1.2 MPa and 0.6 MPa steam; less water is consumed for cooling. In the shift process having high steam-gas ratio, medium and low pressure steam may be transported out for plant use; In the case of shift process using industrial off-gas as feed gas, the need for supplemental steam is reduced because of the steam generated in-situ and significant energy saving is realized.

6. This apparatus and method of the instant disclosure has a low reaction temperature and tolerance for low steam-gas ratio. The low-temperature isothermal bed has a radial flow configuration, as is the pre-shift guard bed and the lower catalyst bed. Reactor pressure drop is less than 0.05 MPa, and system pressure drop is less than 0.2 MPa.

7. The instant disclosure provides a high height-to-diameter ratio, a high reactor production capacity; easy to scale up: for example a daily production of 1500 ton synthesis ammonia, the shift reaction having feed gas CO of 64% and having effluent CO content of 0.8% may be achieved by using a isothermal shift reactor of internal diameter of 4000 mm, net height 17 meters.

CO contents and concentrations are volume based for the discussion below.

Carbon Monoxide CO may be shifted to useful $H_2$ and the reaction formula for the shift reaction is as follows:

$$CO + H_2O \text{ (steam)} = CO_2 + H_2 + Q$$

A shift reaction is a reversible exothermic reaction, the presence of a catalyst and excess of $H_2O$ (steam) allows the reaction to proceed in the direction of $H_2$ generation.

The catalyst is cobalt, molybdenum based shift reaction catalyst, the active ingredients of which are $MoS_2$ and $CoS_2$. The temperature range for shift catalyst is 230° C.~470° C.

$$MoS_2 + 2H_2O = MoO_2 + 2H_2S$$

The evolved heat from the exothermic reaction will heat up the reaction gas and the catalyst bed simultaneously. For every 1% CO reaction (wet basis), the temperature will rise 9° C.~10° C. (5° C.~6° C. for dry basis); High CO conversion (high CO content in the feed and low CO content in the effluent) would cause more rapid temperature rise due to the fast release of the reaction heat.

For example: Reaction of CO content of gas 65% (dry basis), steam-gas ratio R=1.15 in the feed, having CO content 8.6% (dry basis) in the effluent after the reaction, shall be per:

$$CO + H_2O = CO_2 + H_2 + Q$$

65 115 4.3 23.7
Calculation of reacted CO:

$$(65 - \Delta CO)/(100 + \Delta CO) = 0.086$$

ΔCO=52
Reaction heat: 9590 cal/mol
Heat evolved: 52×9590=498680 Kcal/h
Cp: 9.01 kcal/kmol ° C.
Material after reaction (in mols)=100+115=215 kmol/h $$498680 = 215 \times 9.01 \times \Delta t,$$

Δt=257.43

If the temperature before the reaction is 245° C., then the temperature after reaction may be: 257.43+245=502.43° C., which exceeds the catalyst operating temperature range. Catalyst activity may be severely affected.

If the CO content of the feed gas is very high, for example 45% to 80%, as soon as it enters into the reactor, large amount of CO will react immediately and the temperature will rise rapidly, especially in the presence of large of steam content in the feed, the reaction gets accelerated and high temperature spots spread out in the catalyst bed.

CO conversion is difficult to achieve especially when the CO concentration in the gas mixture gets close to the low point of the end reaction. For example when the CO shift conversion has reached 90% (CO content of reaction gas decreases to 1.5%), if another 1% CO (CO content of reaction gas decreases to 0.5%), one more terminal shift reactor may be added with 40% catalyst volume of total system catalyst volume based on current adiabatic shift technology.

For those situations with feed gas having insufficient steam content, such as industrial off-gas, semi water coal gas etc., as the shift conversion increases, excess of steam will be utilized which consequently increases steam consumption.

The current adiabatic technology uses the multi-reactor multi-stage method to tackle the challenges described above. As shown in FIG. 1, feed gas gets preheated to the initial temperature for catalytic reaction; a certain amount of steam gets added to attain a certain steam gas ratio; a limited amount of the CO gets shifted in the 1st shift reactor in order to keep the temperature rise within the operational temperature range for the catalyst. Reaction gas flows through a cooling process, the temperature should not be lowered too much to reach the dew point to avoid catalyst hydrolysis; a limited amount of the CO gets shifted further in the $2^{nd}$ shift reactor following the prior guidelines. Then CO conversion completes in the $3^{rd}$ or $4^{th}$ or $5^{th}$ reactor. For example, in the case that the CO content of the gas is 68.65%, steam-gas ratio is 1.45, temperature is 211° C. water gets removed, in the water-steam separator (E-1); reaction gas gets heated up to 296° C. by gas-to-gas heat exchanger (E-2), two sets of guard column (E-3 and E-5), pre-shift reactors (E-4 and E-6) are connected in parallel CO content decreases to 35% after the pre-shift reactor. Reaction gas gets heated up to 380° C., flows through the heat exchanger (E-2), the medium pressure steam condenser (E-7); gas temperature decreases; reaction gas enters into the 3rd shift reactor, CO content decreases to 6.7%; reaction gas gets heated up to 434° C., flows through the water purifier (E-9), the medium pressure steam condenser for cooling E-10, through the condensate heater (E-11), enters into the $4^{th}$ shift reactor for reaction; CO content decreases to 1%; gets heated up to 260° C., through the low pressure steam condenser (E-13); temperature decreases to 185° C., enters into the 5th shift reactor (E-14) for reaction; CO content decreases to 0.4%; gets heated up to 204° C., through the boiler feed water heater (E-15), low pressure condenser (E-16), moisture separator (E-17) and to downstream process.

Current conventional adiabatic technology has issues as below:

1. In the case that the reaction gas has a CO content 68.65% for ammonia or hydrogen production, the CO content needs to be decreased to as low as 0.4%; Five reactors and four shift stage are often utilized to reach CO conversion of 99% or higher plus a gas-gas heat exchanger, 6 cooling condensers, a water cooler, at least 17 pieces of equipment. More piping, excess land use, high investment and operational difficulty are direct results of the complex shift process.

2. In the case that the CO content of the reaction gas is as high as 70%~86%, more equipment and even longer piping are used. Four to five shift reactors sometimes can't complete the CO conversion.

3. In the case that 85% CO conversion occurs in the temperature range of 380° C.~430° C., the high temperature will easily cause catalyst sintering and severely impair catalyst lifetime. Heat-stressed condition constrains material selections for shift reactor and piping construction.

4. Most of the catalyst bed operates under temperature as high as 400° C. The high temperature condition disfavors the reaction equilibrium for CO conversion. More catalyst is used to reach an equivalent CO conversion as that under low temperature condition.

5. Evolved heat from the condensation are used for generating low pressure (for example 0.6~2.5 MPa) steam; large amount of condensate are discharged. Reaction heat is not utilized efficiently.

6. For (E-9), direct water spray is used to lower the reaction temperature, the moisture may cause catalyst deformation, thus severely impair the catalyst performance and shorten the lifetime.

FIRST EXAMPLE

The CO content in the feed gas may be as high as 85% or above, while CO content in effluent gas may be decreased to 0.4%. The catalyst used in the shift reaction is sulfur-containing-cobalt-molybdenum shift reaction catalyst having $MoS_2$ and $CoS_2$ as active compounds. The instant disclosure is applicable for catalyst bed temperature is higher than the dew point temperature for 30° C.~40° C., within the low end of the catalyst activity temperature (230° C.~310° C.) and the maximum axial temperature variation of the reaction bed is in the range of 3° C.~8° C.

Figure 3:
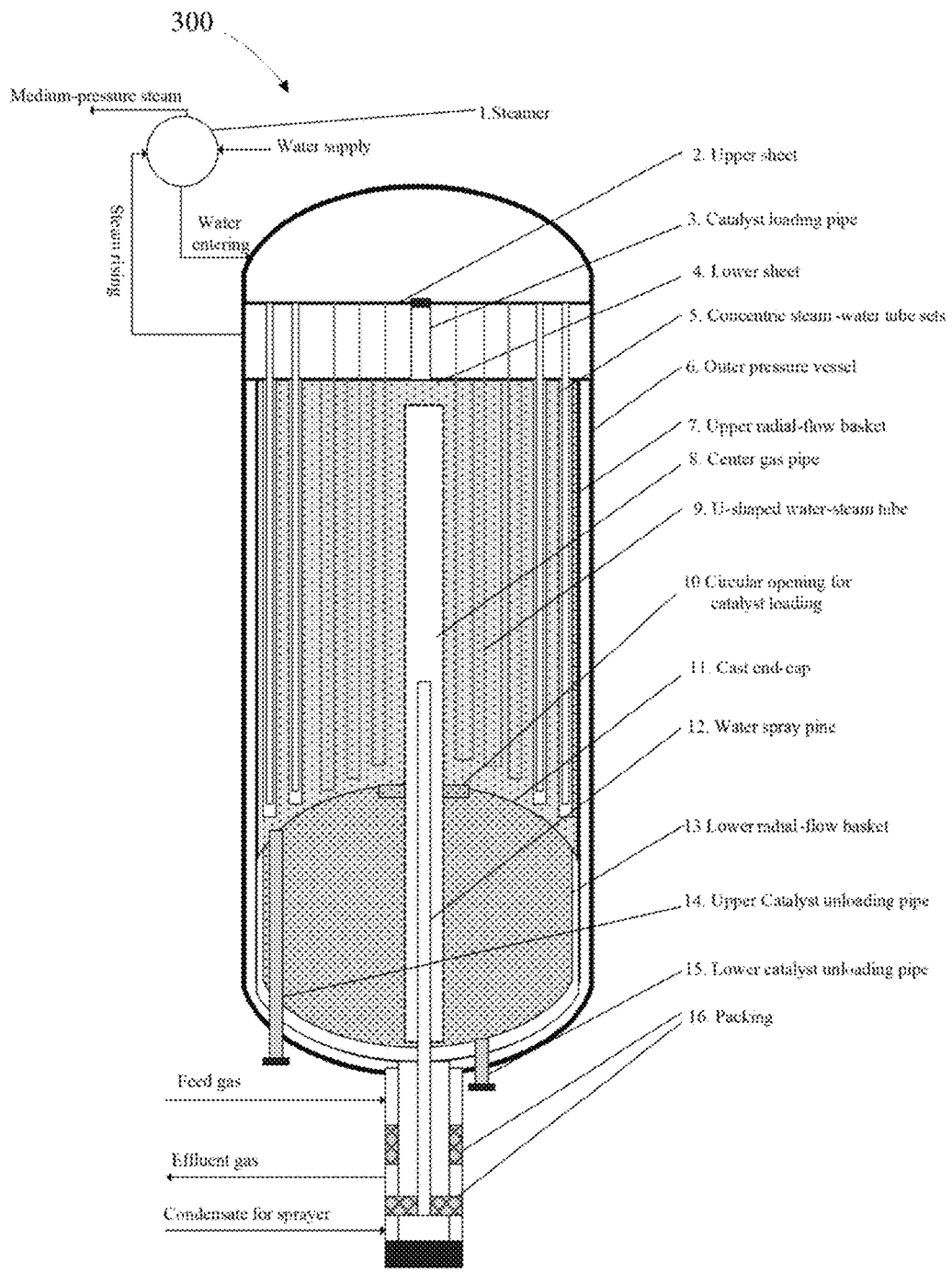
FIG. 3 is an illustration of a reactor configuration as described in an implementation case in accordance with one embodiment of the disclosure.

The reactor is a cylinder-shaped as shown in FIG. 3; it comprises an upper tube sheet (2), catalyst load pipes (3), lower tube sheet (4), concentric water-steam tube sets (5), outside pressure vessel (6), upper radial catalyst bed (7), central gas pipe (8), U-shaped water-steam tubes (9), circular opening for catalysts (10), cast end-cap (11), sprayer nozzle for steam-water addition (12), lower radial catalyst bed (13), upper (14) and lower (15) catalyst unload pipes, packing material for sealing (16), bottom tee joint and external steam drum (1).

Upper radial catalyst bed (7) has a number of concentric steam-water tubes (5) while there are no tubes in the lower radial catalyst bed (13). The two tube sheets (2, 4) divide the steam chamber and water chamber. Chambers are connected to the steam having the steam-rising pipe and the water-down-flowing pipe.

The upper and lower catalyst bed (7, 13) are in a radial flow configuration. The flow direction in the upper catalyst bed is from outside in, while it is from inside out in the lower catalyst bed (13).

There are trumpet-shaped openings on the wail of the outer catalyst bed and the central gas pipe (8) to ensure the gas spray-flow through the catalyst bed radially and form a good gas flow distribution. The radial flow configuration reduces the pressure resistance. When reaction gas initially enters the catalyst bed (7, 13) from outside in, the CO content is high, which strongly drives the reaction to a high reaction rate. The CO having a concentration (by volume) of 60% will be converted into $H_2$ and $CO_2$ at the outside circular area in the radial catalyst bed (7, 13). The concentric water-steam tube sets (5) in this outside circular area have smaller diameters, and are more densely distributed in the catalyst bed; The U-shaped water-steam tubes (9) in the inside circular area of the catalyst bed are of larger diameter and less densely distributed. The said water-steam tubes are of two types. The concentric water-steam tubes (5) are in the outside circular area. The U-shaped tubes (9) are in the inside circular area. The bottom of the outer tube (18) of the concentric tube set (5) is of a closed configuration; the top of the outer tube (18) is welded on the lower tube sheet (4); The bottom of the inner tube (17) of the concentric tube set (5) is of an open configuration; there is a small distance between the bottom of the inner tube (17) and that of the outer tube (18); the top of the inner tube (17) is welded on the upper tube sheet (2). The longer end of the U-shaped tube (9) is welded on the upper tube sheet (2); the shorter end is welded on the lower tube sheet (4). The concentric tube sets may be more densely distributed; the inner tube (17) is for flow directing, not for heat transfer; the double tube configuration is more costly; The U-shaped tubes (9) may be less densely distributed and are less costly.

As shown in FIG. 3, there are a number of B-shaped positioning spacers (19) between the inner tube (17) and outer tube (18) tube of the concentric tube set. There is a taper-shaped positioning spring (20) at the bottom of the inner tube (17) to ensure mechanical flexibility and reliability as well. The reaction gas containing CO enters through the bottom tee joint, through the annular space from the bottom to the top, through the openings on the catalyst basket radially from outside in the upper catalyst bed (7); The CO content will drop to 3%~5%. Then the reaction gas exits the upper catalyst bed into the central gas pipe (8). It flows from the top to the bottom of the upper bed and into the lower catalyst bed (13). The reaction gas runs through the lower bed (7) from outside in and the CO content decreased to 0.4%~1.0% and exits through the openings on the lower catalyst basket and completes the shift reaction. The effluent gas exits the reactor through the bottom tee joint. The water from the steam drum (1) flows to the water chamber, then to the longer side of the U-shaped tube (9) or the inner tube (17) of the concentric tube set (5) respectively. Water enters the inner tube (17) from top to bottom and absorbs the evolved reaction heat from the catalyst bed; water becomes steam and runs in the outer tube from bottom to top and rises up to the steam drum (1). Water also enters the longer side of the U-shaped tube (9) and runs from top to bottom, absorbs reaction heat and gets partially vaporized; the water-steam mixture runs to the shorter side of the U-shape tube (9) and runs from bottom to top and absorb more reaction heat and rises up to the steam drum (1). The water-steam mixture gets separated in the steam drum (1); steam is sent out for plant use; water flows to the tubes in reactor and completes another continues water-steam cycle.

The catalyst volume in the upper radial catalyst bed (7) is approximately 48%~60% of the total volume; that in the lower radial catalyst bed is of approximately 40%~52% of the total volume.

The pipes for catalyst loading (3) are of large diameter; they run through the cast end-cap (11) on the top of the lower catalyst bed (13).

When a catalyst change occurs, the used catalyst in the reactor may be un-loaded. The two upper catalyst unloading pipes (14) are located symmetrically at the side of the cylindrical vessel. The two symmetrical lower catalyst unloading pipes (15) are for the lower catalyst bed (13). The bottom of the unloading pipe is sealed with high-pressure blind sheet to prevent the falling of the catalyst during operation.

SECOND EXAMPLE

Figure 4:
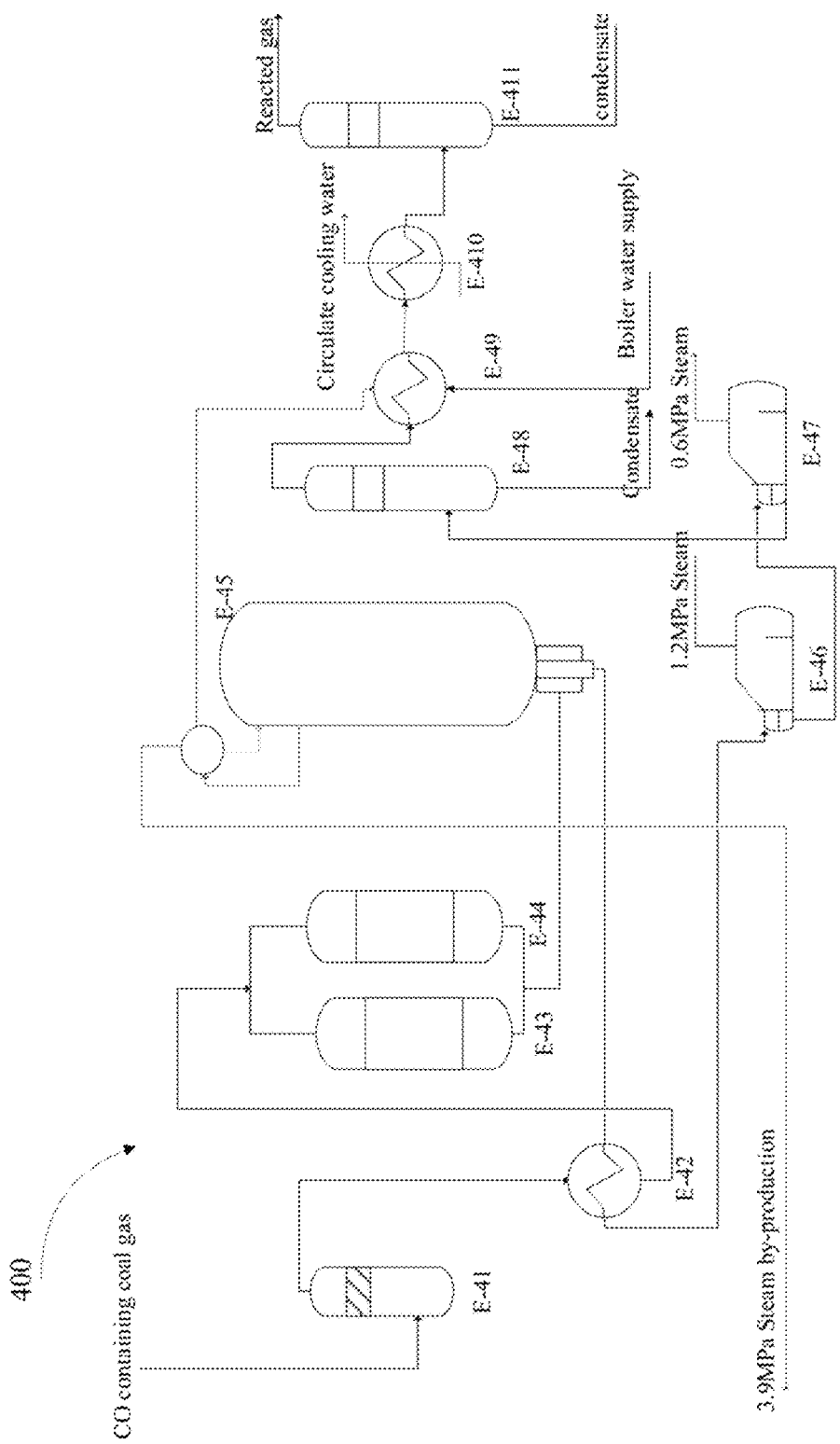
FIG. 4 is a process chart of isothermal CO shift process using coal-gas as feed gas in accordance with one embodiment of the disclosure.

As shown in FIG. 4, this is the shift process chart for coal gas having CO concentration (by volume) of 40%~70%, steam-gas ratio of 1.3~1.6. It comprises the 1st water separator (E-41), the heat exchanger (E-42), the guard column (E-43), (E-44), the isothermal shift reactor (E-45), and the 1st waste heat boiler (E-47), the 2nd water separator (E-48), the boiler feed water heater (E-49), the condenser (E-410) and the 3rd water separator. During the process, the feed gas containing CO flows through 1st water separator (E-41) to the heat exchanger (E-42), the un-reacted gas is heated up to 230° C.~240° C. and then flows to the guard column (E-43, E-44); chlorine, phosphorus, oxygen, hydrocarbon and other impurity compounds get removed in the guard column CO gets converted in the guard column. Gas temperature rises up 255° C.~265° C., enters into isothermal shift reactor (E-45) through the bottom tee joint. Reaction temperature in the catalyst bed is in the range of 260° C.~275° C. After the reaction, the CO concentration (by volume) is about 0.7%. Reacted gas exits from the bottom tee joint, flows through the heat exchanger (E-42) to the 1st waste heat boiler (E-46) and generate 1.2 MPa steam. The reacted gas flows through the $2^{nd}$ waste heat boiler and generate 0.6 MPa steam. The saturated steam of three different pressure are sent out for plant use of corresponding pressure level. The temperature of the reacted gas decrease to 255~265° C. Then it flows through the 2nd water separator (E-48), the gas temperature decreases to about 180° C. The excess steam becomes condensation. The excess heat including condensation heat will produce 1.3 MPa and 0.6 MPa steam respectively. After going through the boiler feed water heater (E-49), it heats up the boiler desalted water and deoxygenated water; then gas temperature may decrease to 75° C.~80° C.; it flows through the condenser (E-410). It gets cooled down to 40° C. by circulating cold water. Large amount of steam in the reacted gas becomes condensation and flows through the 1st and 3rd water separator (E-411). The condensation gets separated and the reacted gas gets sent to downstream process.

The heated boiler desalted water gets sent to the steam drum (1) as supplemental water supply for steam-water tubes in the reactor and supply for low-pressure steam drum (1). Generated steam gets sent out for plant use.

THIRD EXAMPLE

Figure 5:
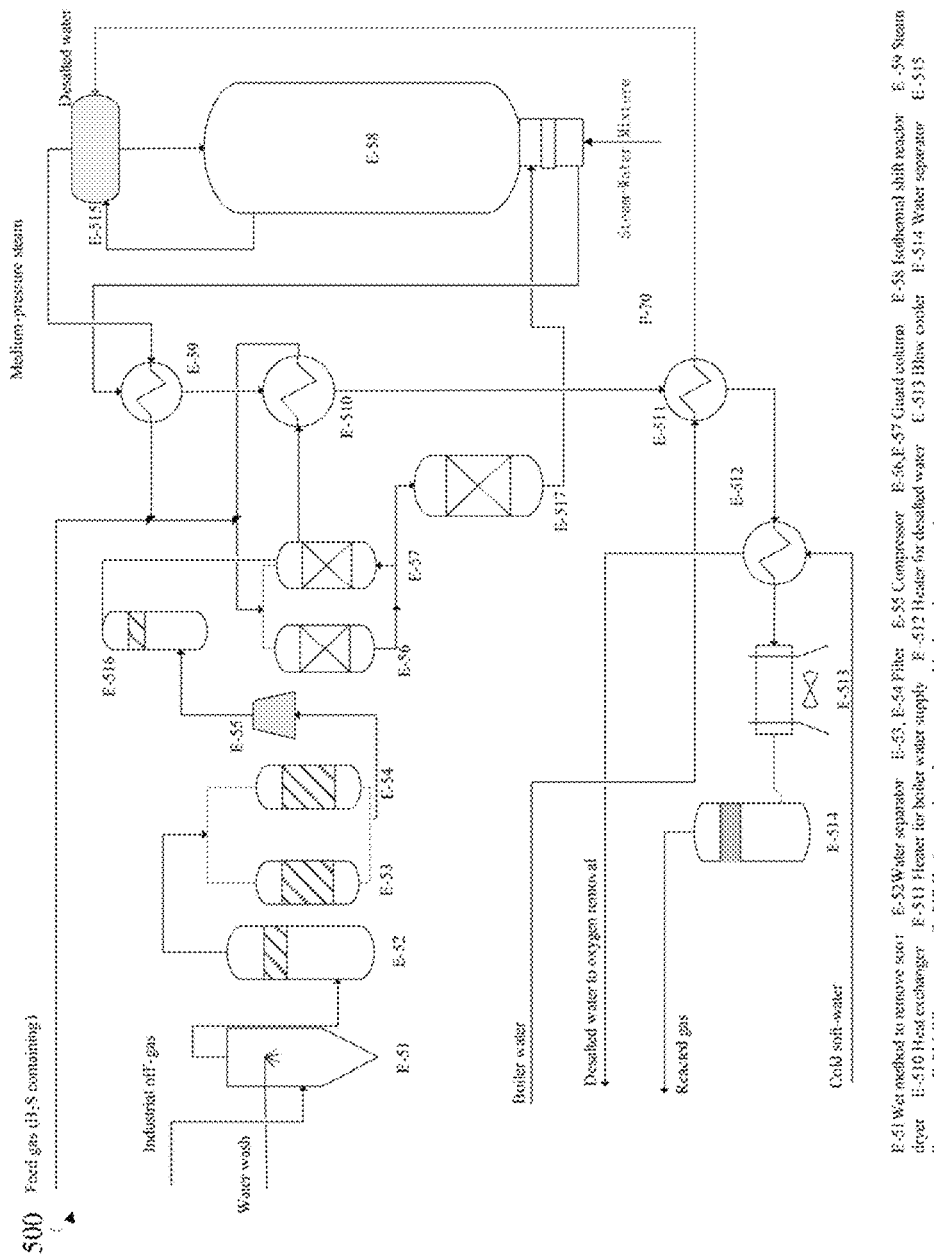
FIG. 5 is a process chart of isothermal CO shift process for industrial off-gas Feed in accordance with one embodiment of the disclosure.

As shown in FIG. 5, this is a process chart for isothermal shift reaction of industrial off-gas having CO content of 50%~85% (such as acetylene production off-gas, steel production reforming gas, yellow phosphorus production off-gas);

The characteristic of industrial off-gas is that: CO content is high (40%~85%), barely containing any water vapor and sulfur, containing large amount of soot and oxygen. Acetylene production off-gas also contains unsaturated hydrocarbons.

As shown in FIG. 5, this isothermal shift process comprises the (E-51) stripping tower, the (E-52) water separator, the parallel filters (E-53, E-54): one online, the other for back-up, the compressor (E-55), the degreaser (E-516), guard column (E-56, E-57); one online, the other for back-up, the hydrogenation converter (E-517) for the removal of unsaturated hydrocarbons, the isothermal shift reactor (E-58), the steam dryer (E-59), the heat exchanger (E-510), the boiler desalted water heater (E-511), the deoxygenated water heater (E-512), the cooling blower (E-513), the 5th water separator (E-514), and the steam drum (E-515).

The industrial off-gas flows to the stripping tower (E-51), soot and dusts are removed with circulating water; feed gas flows through the 4th water separator, then to the parallel filters (E-53, E-54); one online and the other for back-up. Dust gets reduced to ~0.1 mg. The feed gas gets compressed by gas compressor (E-55) to 1.8 MPa~2.3 MPa then flows to the heat exchanger (E-510); gas temperature increases to 200° C.~225° C., flows to parallel guard columns (E-56, E-57) to remove the chlorine, phosphorus, oxygen, hydrocarbon compounds, where CO gets converted. Gas gets heated up to 225° C.~250° C., flows to the hydrogenation converter (E-517) to remove un-saturated hydrocarbons, then flows to isothermal shift reactor (E-58) through bottom tee joint for shift reaction. Catalyst bed temperature is in the range of 235° C.~260° C. After the reaction, the CO content decreases to the level of about 0.7%. Gas that has reacted may exit from the bottom tee joint. The reacted hot gas flows through steam dryer (E-59), dries up the in-situ produced saturated steam; gas temperature drops to about 230° C.~255° C. at the heat exchanger (E-510), then flows through the boiler desalted water heater and heats up the boiler desalted water, then flows through the deoxygenated water heater (E-512) and heats up the deoxygenated water; gas temperature drops to 75° C.~80° C. Then it flows through the blow cooler (E-513), gets cooled to 40° C. by air cooling (or circulating cold water). A large amount of the steam in the reacted gas may condensate and flow through the 5th water separator (E-514). The condensate water gets separated and the gas is sent to downstream process.

The heated boiler desalted water is sent to the steam drum (1) as supplemental water supply for the water-steam tubes in the shift reactor and generate medium pressure steam to participate in the shift reaction as the steam reactant. Additional saturated steam-water mixture is also supplemented from the bottom of the said shift reactor to direct to chemical equilibrium to improve CO conversion.

FOURTH EXAMPLE

Figure 6:
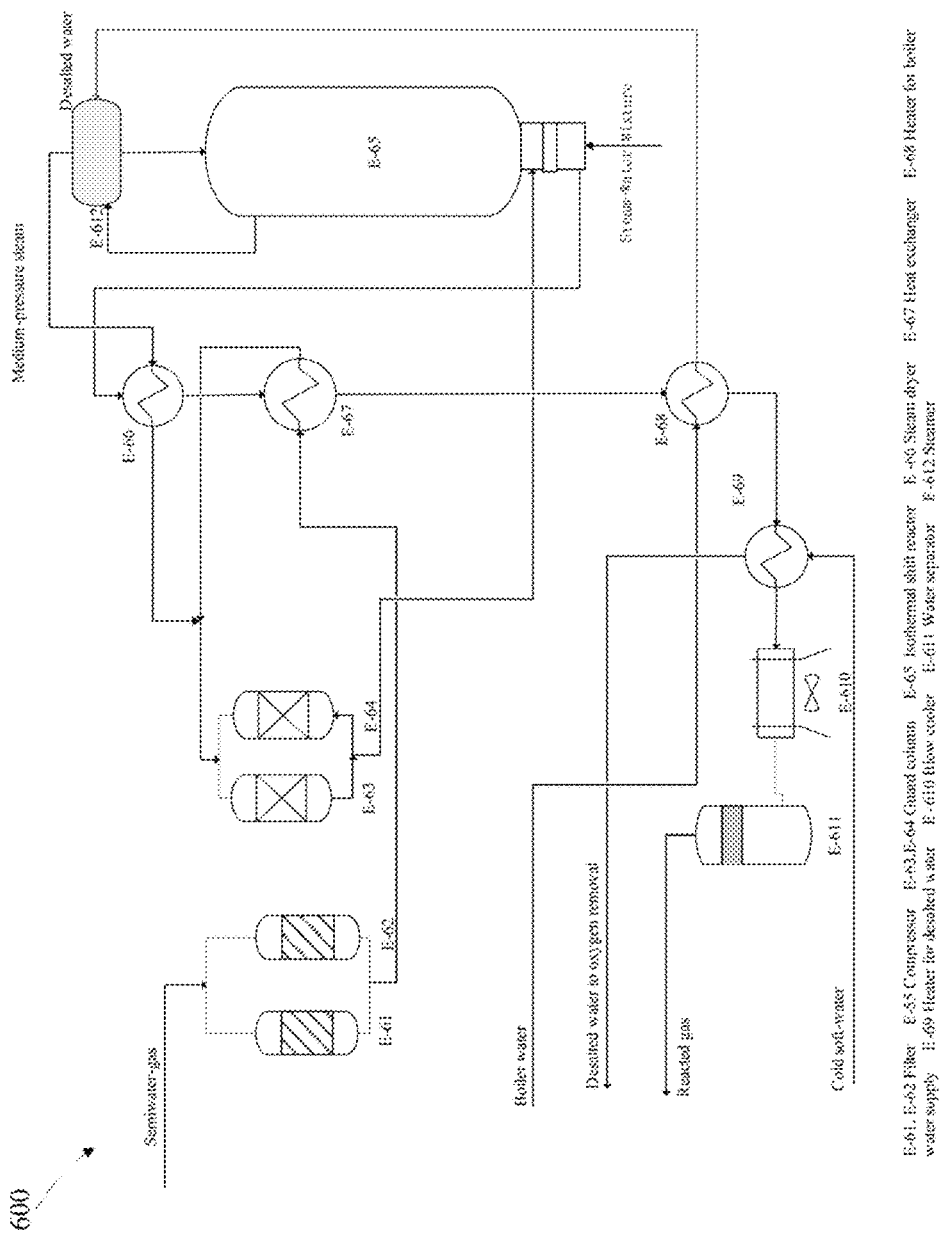
FIG. 6 is a process chart of isothermal CO shift process for semi-water coal gas in accordance with one embodiment of the disclosure.

As shown in FIG. 6, this process chart is the implantation case of the instant disclosure for the isothermal shift reaction of the semi-water coal gas having CO content of 30%~38% Although the CO content of semi-water coal gas is not as high, the CO content of the effluent gas from the shift process may be as low as 0.4%~0.6% for downstream ammonia synthesis. The coal gas contains soot/dust, grease, oxygen, chlorine, and doesn't contain steam. This process technology of the instant disclosure comprises two filters (E-61, E-62); one online and the other for back-up. Dust/soot, tar and grease get removed. The feed gas flows through the heat exchanger (E-67). Gas temperature rises up to 210° C.~230° C. It flows through the parallel guard columns (E-63), (E-64) to remove oxygen, chlorine, phosphorus compounds, where CO also gets converted. Gas temperature may increase to 230° C.~250° C. It then enters into the isothermal shift reactor (E-65) through bottom tee joint for the shift reaction. Catalyst bed temperature is in the range of 230° C.~265° C. After the reaction, the CO content drops to about 0.4%~0.6% to reach the shift technology mix for ammonia production. Reacted gas exits from the bottom tee joint; the hot reacted gas flows through steam dryer (E-66) and dries up the in-situ generated saturated steam. Gas temperature drops to about 230° C.~255° C. It flows to the heat exchanger (E-67) and heats up the semi-water coal gas; then it flows through the boiler desalted water heater (69) and heats up the boiler desalted water. It then heats up the deoxygenated water. Gas temperature drops to 75° C.~80° C. then flows through the condenser (E-610), gets cooled to 40° C. by circulating cold water. Large amount of steam in the reacted gas-steam condensates and flows through 6th water separator (E-611). Water gets separated from the reacted gas. The gas is sent to downstream process.

The heated boiler desalted water is sent to the steam drum (1) as make-up water for the steam-water circulation in the shift reaction; medium pressure steam is generated and added back into the shift reactor as a reactants. Additional steam-water mixture is added from the bottom of the said shift reactor to direct the chemical equilibrium to higher CO conversion.

What is claimed is:

1. A reactor, comprising:
an outside pressure vessel defining a chamber, wherein said chamber comprises upper and lower tube sheets located at an upper section of said chamber;
a bottom tee joint located at a bottom of the outside pressure vessel chamber, wherein said bottom tee joint has an unreacted gas entrance for unreacted gas, a reacted gas outlet for reacted gas, and a steam-water entrance for a steam-water mixture;
an upper seal head coupled to an outside pressure vessel chamber upper end;
a lower seal head coupled to an outside pressure vessel chamber lower end;
a water chamber defined by said upper seal head and said upper tube sheet;
a steam chamber defined by the upper tube sheet and the lower tube sheet, said water chamber is connected by connection tubes to said steam chamber located at the outside pressure vessel chamber upper end;
an upper catalyst bed located at an upper mid portion of said outside pressure vessel chamber and a lower catalyst bed located at a lower mid portion of said outside pressure vessel chamber, said upper catalyst bed and an inner wall of the outside pressure vessel defining an annular space, wherein the unreacted gas flows through the unreacted gas entrance to said annular space to said upper catalyst bed and the reacted gas flows out of the lower catalyst bed through the reacted gas outlet;
a supporting seal head is located between said upper catalyst bed and lower catalyst bed; and
an inner unit of said outside pressure vessel comprises central tubes having a central tube upper end located in said upper catalyst bed and having a central tube lower end located in said lower catalyst bed, wherein said central tubes have a sprayer nozzle for said steam-water mixture, wherein said sprayer nozzle for steam-water mixture is connected to said steam water entrance.

2. The reactor of claim 1, wherein said upper catalyst bed is installed with a plurality of vertically configured concentric double water-steam tubes.

3. The reactor of claim 2, wherein said water-steam tubes are concentric water-steam tubes, comprising of an inner tube and an outer tube with a number of spacers positioned in between, wherein at bottom of a close-ended outer tube there is a spring for position-securing, wherein the bottom of the inner tube is open-ended to enable a water-steam flow to run to said outer tube, wherein an upper side of the inner tube extends out of said outer tube to said water chamber, wherein an upper side of the outer tubes are extended lower to said steam chamber.

4. The reactor of claim 1, further comprising U-shaped water-steam tubes having two sides of different lengths, wherein longer tubes are extended into said water chamber and shorter tubes are extended to said steam chamber.

5. The reactor of claim 1, wherein a top part of said upper catalyst bed is connected to catalyst loading pipes and the bottom of said upper catalyst bed is connected to catalyst unloading pipes; loading openings are located at the supporting seal head between said upper catalyst bed and said lower catalyst bed to allow catalyst loading from a top of the reactor; and pipes are connected to the bottom of the lower catalyst bed for catalyst unloading.

6. The reactor of claim 1, wherein a loading volume of said upper catalyst bed is from approximately 48% to approximately 60% of a total catalyst volume and that of said lower catalyst bed is of approximately 40% to approximately 52% of the total catalyst volume.

7. The reactor of claim 3, wherein a plurality of B-shaped position spacers are located between the inner tube and outer tube and are spring loaded to enable position-securing and flexibility.

8. The reactor of claim 1, wherein a transit wall is located inside in the vessel as part of a catalyst basket of said upper catalyst bed and said lower catalyst bed, wherein said transit wall has trumpet-shaped orifices.

* * * * *